(12) United States Patent  (10) Patent No.: US 7,789,929 B2
Riley  (45) Date of Patent: Sep. 7, 2010

(54) DIESEL PARTICULATE FILTER AND METHOD FOR FORMING SUCH FILTER

(75) Inventor: James Riley, Northville, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 674 days.

(21) Appl. No.: 11/696,229

(22) Filed: Apr. 4, 2007

(65) Prior Publication Data

US 2008/0245040 A1   Oct. 9, 2008

(51) Int. Cl.
 *B01D 39/00* (2006.01)
(52) U.S. Cl. .............................. 55/522; 55/523; 55/529; 55/DIG. 5; 55/DIG. 10; 55/DIG. 30; 55/385.3; 422/180; 60/311; 428/116; 264/138; 264/145; 264/148; 264/628; 264/630; 264/631; 264/DIG. 48
(58) Field of Classification Search ................... 55/523, 55/529, DIG. 5, DIG. 10, DIG. 30; 264/177.12, 264/138, 145, 148, DIG. 48, 628, 630, 631; 422/180; 60/311; 425/382 R; 210/510.1; 428/116
See application file for complete search history.

(56) References Cited

U.S. PATENT DOCUMENTS

| 5,487,694 | A | | 1/1996 | Deming |
| 5,914,187 | A | * | 6/1999 | Naruse et al. ............... 428/327 |
| 6,669,751 | B1 | | 12/2003 | Ohno et al. |
| 2004/0031149 | A1 | * | 2/2004 | Irie et al. ....................... 29/890 |
| 2004/0170803 | A1 | * | 9/2004 | Ichikawa ..................... 428/116 |
| 2005/0166729 | A1 | | 8/2005 | Nishio et al. |
| 2005/0167880 | A1 | | 8/2005 | Nate et al. |
| 2006/0037297 | A1 | * | 2/2006 | Hijikata ....................... 55/523 |
| 2006/0193756 | A1 | * | 8/2006 | Suzuki et al. ............... 422/177 |
| 2007/0026190 | A1 | * | 2/2007 | Baba .......................... 428/116 |
| 2007/0119134 | A1 | * | 5/2007 | Beall et al. .................... 55/523 |
| 2007/0132988 | A1 | * | 6/2007 | Gargano et al. .......... 356/237.6 |
| 2007/0254798 | A1 | * | 11/2007 | Addiego et al. ............. 501/119 |
| 2008/0047243 | A1 | * | 2/2008 | Beall et al. .................... 55/523 |
| 2008/0120968 | A1 | * | 5/2008 | Beall et al. .................... 60/295 |
| 2008/0173071 | A1 | * | 7/2008 | Park et al. ....................... 73/38 |
| 2009/0291255 | A1 | * | 11/2009 | Kunieda et al. ............. 428/116 |
| 2010/0055386 | A1 | * | 3/2010 | Ohno et al. ................. 428/116 |

* cited by examiner

*Primary Examiner*—Jason M Greene
*Assistant Examiner*—Dung Bui

(57) ABSTRACT

A method for forming a diesel particulate filter is presented. The method includes provided an extruder for receiving material to be extruded such extruder being configured to converting such material into a honeycomb structure having a lower portion and an upper portion. The lower portion has a bottom surface and a pair of vertically extending sidewalls terminating along outer edges of the bottom surface. The upper portion has a pair of opposing, pitched, sidewalls having lower edges terminating along upper edges of the vertically extending sidewalls and upper edges terminating along a common edge.

6 Claims, 6 Drawing Sheets

DIESEL PARTICULATE FILTER AND METHOD FOR FORMING SUCH FILTER

TECHNICAL FIELD

This invention relates generally to diesel particulate filters and methods for forming such filters.

BACKGROUND

As is known in the art, the current state of the art in Diesel Particulate Filter (DPF) assemblies are cylindrical structures such as that shown in FIG. 1 and described in described in U.S. Pat. No. 6,669,751. More particularly, the assembly includes inner rectangular cross section filter and outer filter having convex surfaces. Typically, the process used is to form the filters is by extrusion of material, typically silicon carbide, into elongated honeycomb structures having rectangular cross sections. The outer filters are also initially formed as rectangular structures and are further processed using a diamond-cutting tool to first cut along the diagonal of the rectangular section to separate the structure into two triangles, (i.e., a triangular prism shape) in order to facilitate a subsequent corner rounding process. Next, the DPF assembly is formed as shown in FIG. 1 having in the inner core a plurality of rectangular cross section shaped filters and the rounder corner, triangular shaped filters about a portion of the periphery of the assembly as described in the above-referenced U.S. Pat. No. 6,669,751.

This triangle cutting process is slow and costly due to the hardness and abrasive nature of the DPF material. The triangle cutting process is slow because it is done as an offline operation, requiring additional machinery and personnel to operate the machinery. Although suggested in U.S. Pat. No. 6,669,751, DPF manufacturers have experimented with extruding triangular sections, without commercial success. This is due to the fact that the material when extruded, i.e., prior to microwave drying, into triangles, more particularly into a triangular prism shape, lacks the rigidity to be handled and manipulated at its edges or corners.

SUMMARY

In accordance with the present invention, a method is provided for forming a particulate filter. The method includes provided an extruder for receiving material to be extruded such extruder being configured to converting such material into a honeycomb structure having a lower portion and an upper portion. The lower portion has a bottom surface and a pair of vertically extending sidewalls terminating along outer edges of the bottom surface. The upper portion has a pair of opposing, pitched, sidewalls having lower edges terminating along upper edges of the vertically extending sidewalls and upper edges terminating along a common edge.

With such method the extruder provides a shape (i.e., the lower portion) that has the rigidity through its vertically extending sidewalls which can then be more easily handled and manipulated directly out of the extruders without deformation as with corners of a triangular prism shaped extruded structure. This shape can then follow the normal DPF manufacturing process and be inserted into the segmented DPF in the same manner as the typical rectangular segments. More particularly, the extruded structure can be picked up and placed on the necessary conveyor belts for transfer into the microwave drying ovens on its vertically extending sidewalls. Once the extrusion has been dried it can pass through the remaining portions of the DPF manufacturing process in the same manner as the typical rectangular segments.

In accordance with another feature of the invention, a filter element comprises a honeycomb material having a lower portion and an upper portion. The lower portion has a bottom surface and a pair of vertically extending sidewalls terminating along outer edges of the bottom surface. The upper portion has a pair of opposing, pitched, sidewalls having lower edges terminating along upper edges of the vertically extending sidewalls and having upper edges terminating along a common edge.

In accordance with still another feature of the invention, an extruder is provided having a honeycomb structure with a lower portion and an upper portion, the lower portion having a bottom surface and a pair of vertically extending sidewalls terminating along outer edges of the bottom surface, the upper portion having a pair of opposing, pitched, sidewalls having lower edges terminating along upper edges of the vertically extending sidewalls and upper edges terminating along a common edge.

In accordance with yet another feature of the invention, a method for forming a filter includes forming a honeycomb material having: a lower portion and an upper portion; the lower portion having: a bottom surface; and a pair of vertically extending sidewalls terminating along outer edges of the bottom surface; the upper portion having: a pair of opposing, pitched, sidewalls having lower edges terminating along upper edges of the vertically extending sidewalls, and upper edges terminating along a common edge; and removing outer portions of the lower portion to form a curved outer surface on the lower portion, such curved outer surface terminating along surface the upper edges of the vertically extending sidewalls.

In one embodiment, the forming comprises an extrusion process.

In one embodiment, the surface is a concave surface.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
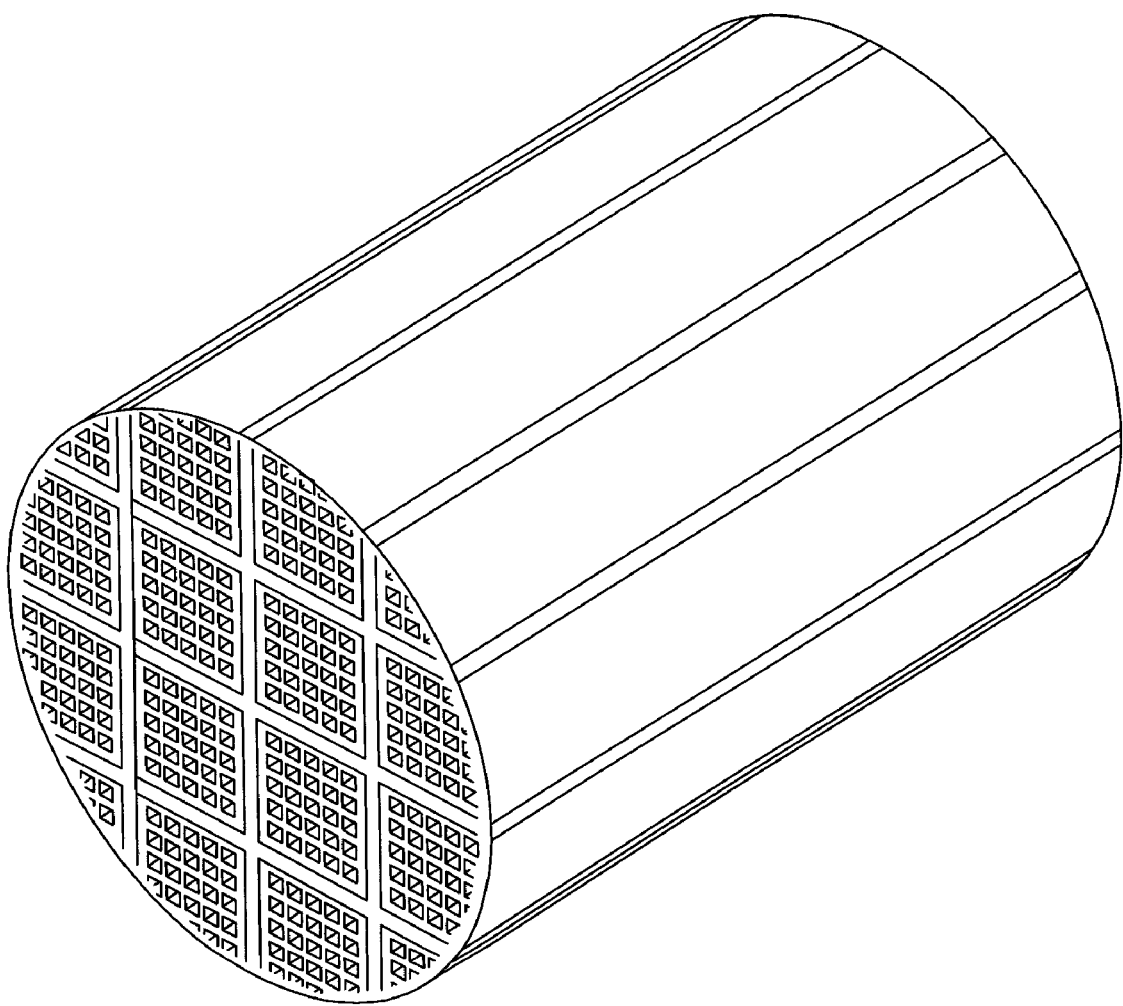
FIG. 1 is a diesel particulate filter assembly according to the PRIOR ART.
Figure 2:
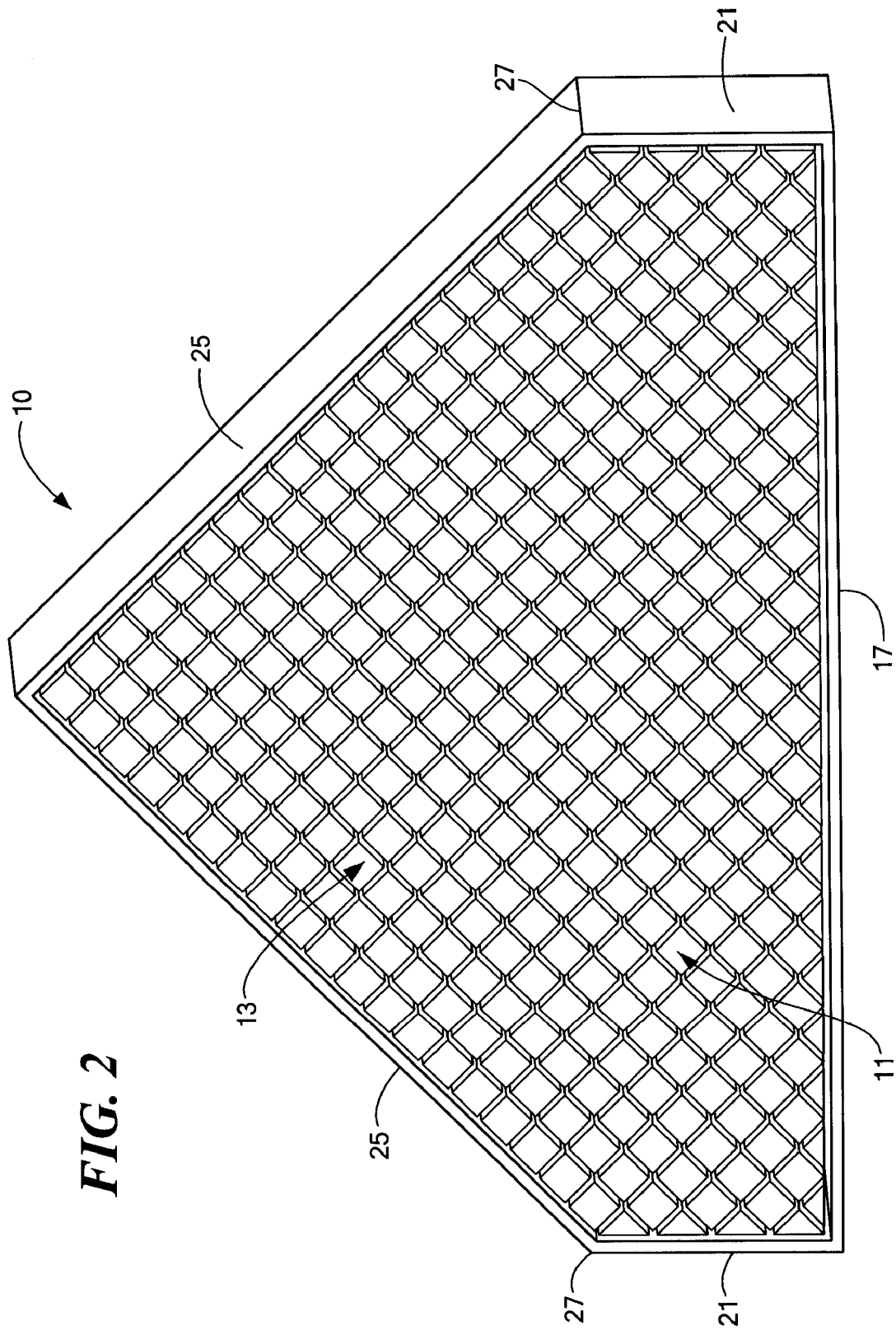
FIG. 2 is a sketch of a portion of an extruder used to form a filter according to the invention at one stage in the manufacture thereof.

Referring now to FIG. 2, an extruder 10 is shown for receiving material, not shown, to be extruded. The extruder is a honeycomb structure with a lower portion 11 and an upper portion 13, the lower portion 11 having a bottom surface 17 and a pair of vertically extending sidewalls 21 terminating along outer edges of the bottom surface 17, the upper portion 13 having a pair of opposing, pitched, sidewalls 25 having lower edges terminating along upper edges of the vertically extending sidewalls and upper edges terminating along a common edge 27.

Figure 3:
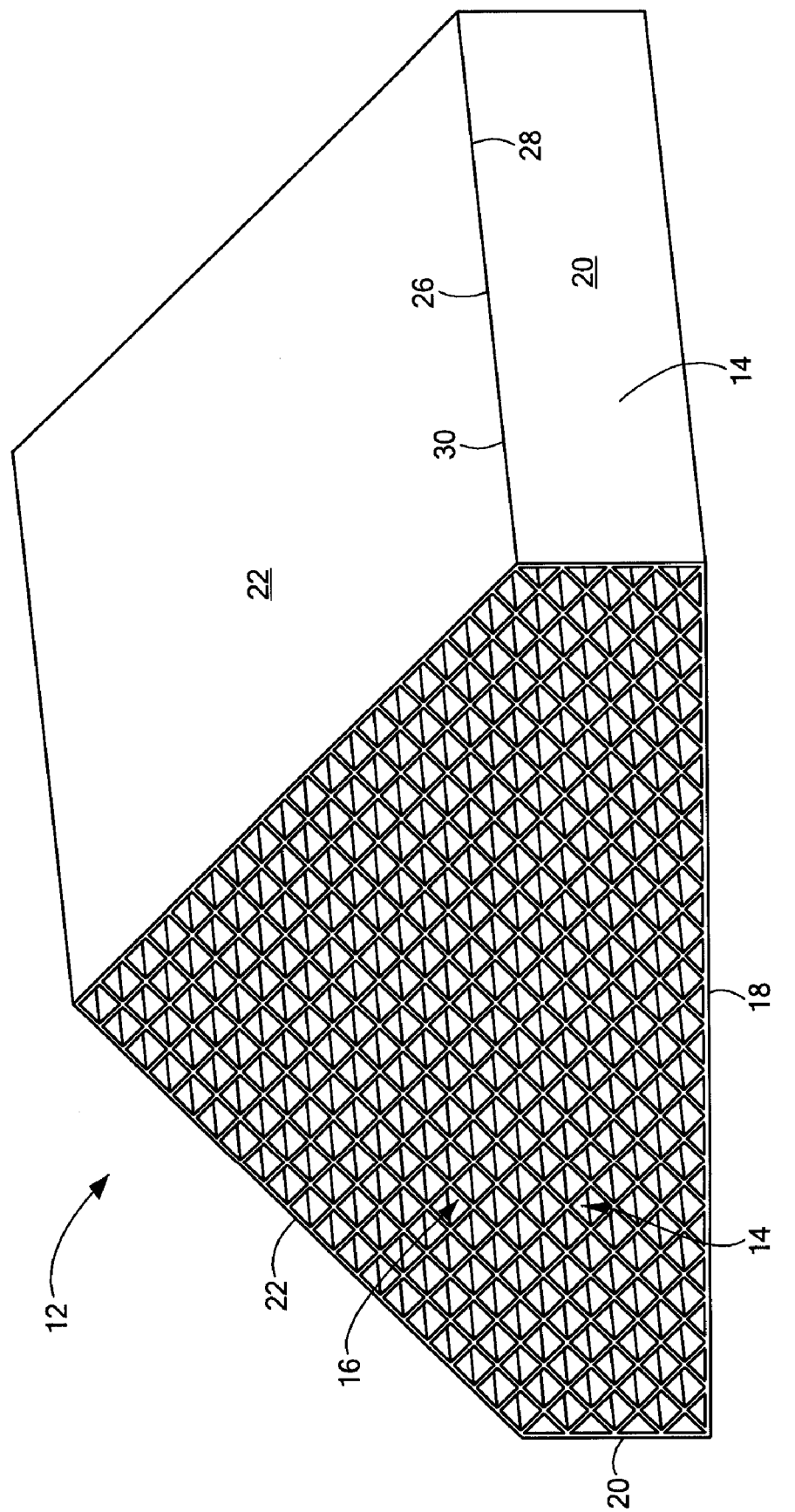
FIG. 3 is a sketch of a filter produced by the extruder of FIG. 2 in accordance with the invention at one stage in the manufacture thereof.
Figure 4:
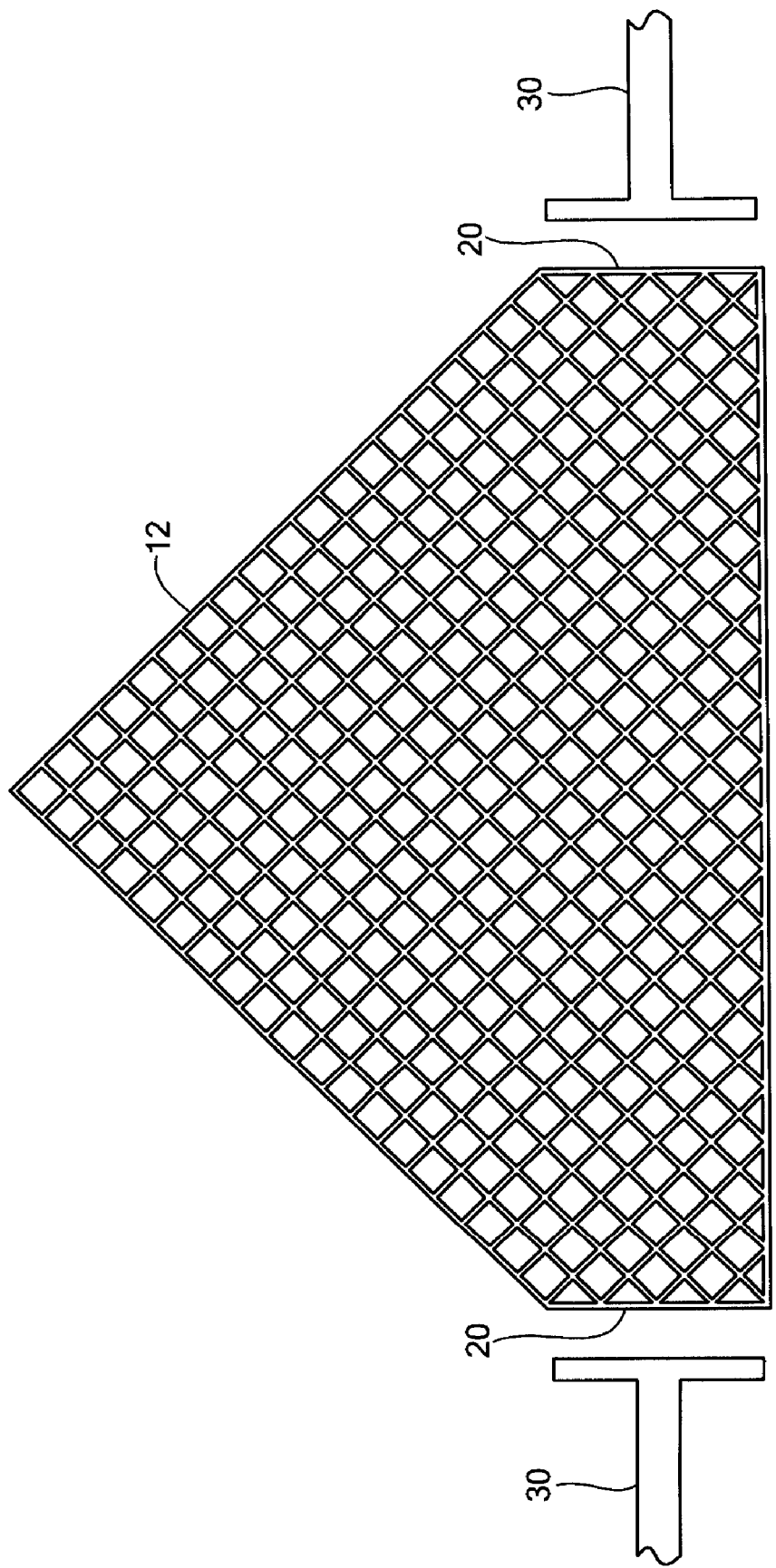
FIG. 4 is a sketch showing the filter of FIG. 3 with a clamp used to hold the filter produced by the extruder of FIG. 3.
Figure 5:
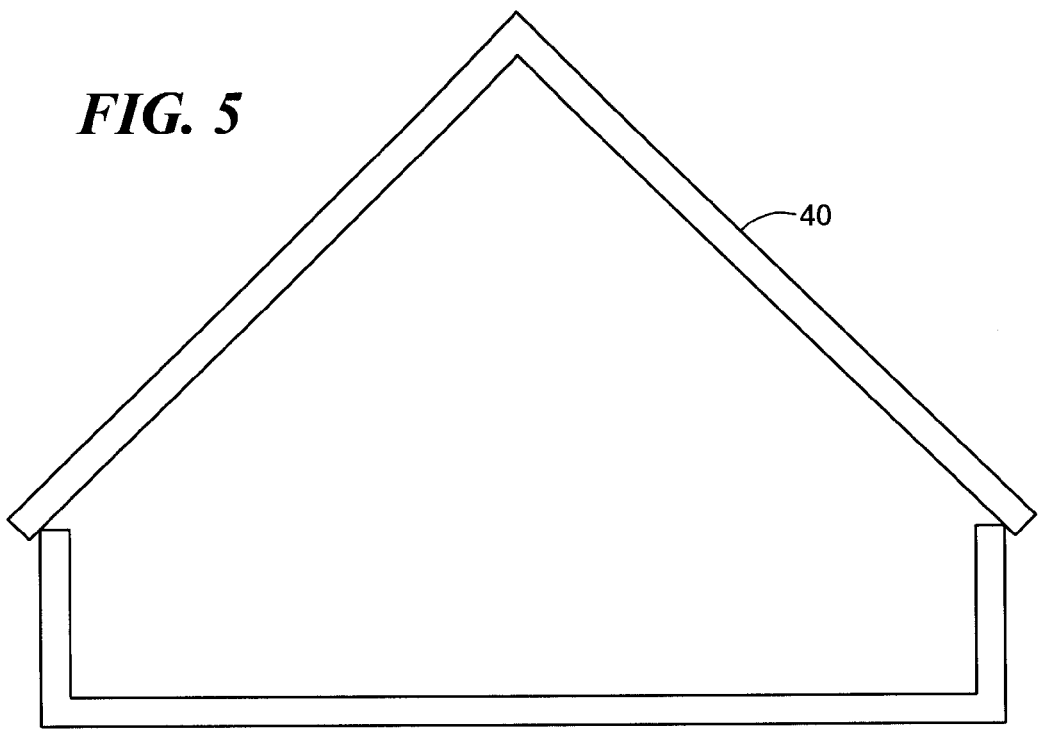
FIG. 5 is a housing used to hold the filter of FIG. 3 for subsequent processing.

The extruder 10 is thus configured to convert such material into a honeycomb structure 12 shown in FIG. 3 having a lower portion 14 and an upper portion 16, the lower portion 14 having a bottom surface 18 and a pair of vertically extending sidewalls 20 terminating along outer edges of the bottom surface 14, the upper portion 16 having a pair of opposing, pitched, sidewalls 22 having lower edges 26 terminating along upper edges 28 of the vertically extending sidewalls 20 and upper edges 28 terminating along a common edge 30.

Figure 6:
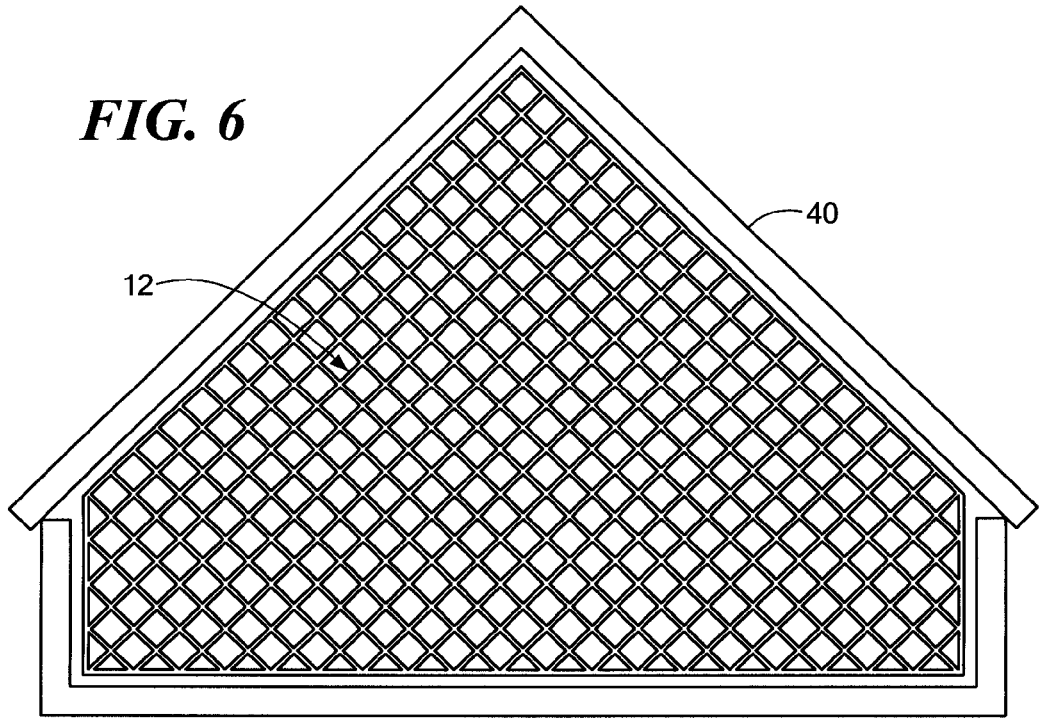
FIG. 6 is a sketch of the filter of FIG. 3 disposed in the housing of FIG. 5.
Figure 7:
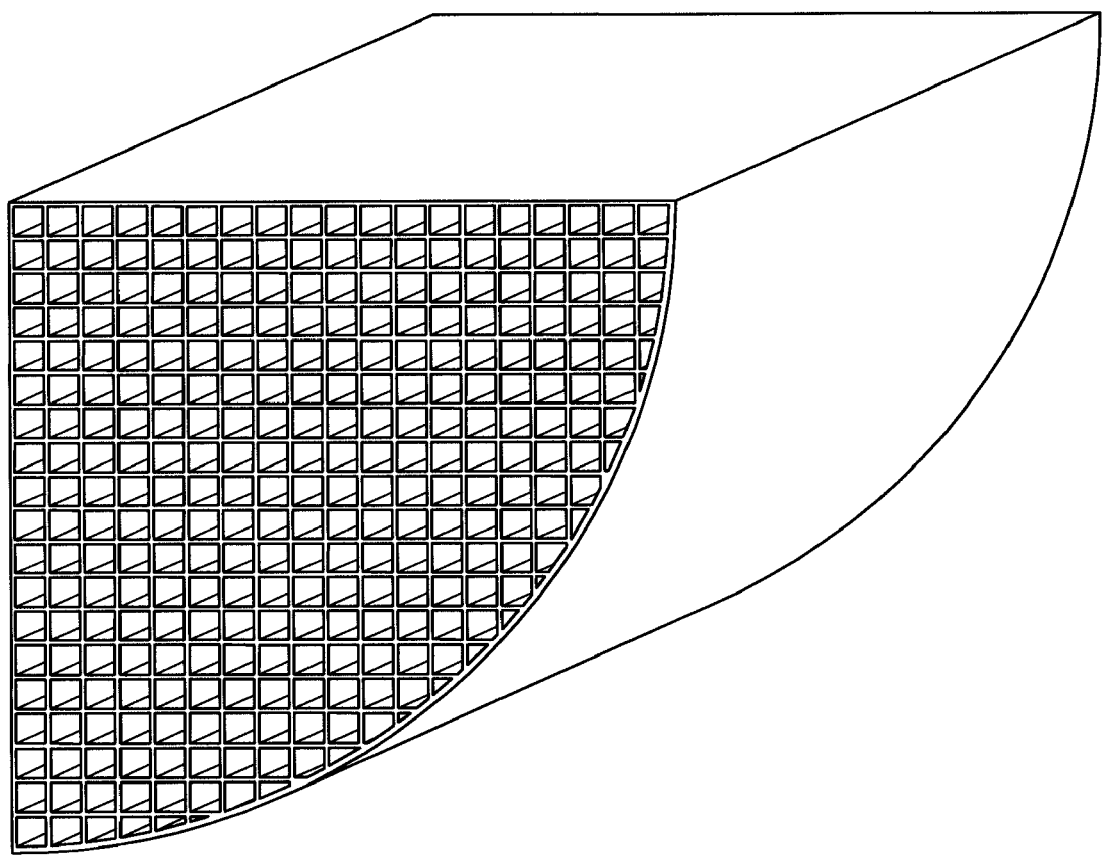
FIG. 7 shows the filter of FIG. 3 after such filter has been heat treated in the housing of FIG. 5 and removed from such housing after such heat treatment, and having the outer surface thereof rounded for insertion into a particulate filter assembly.

After passing through the extruder the material 12 is grasped by clamps 30 engaging the sidewalls 20 and using such clamps inserted into a housing 40 as shown in FIG. 6 for further treatment, wherein the material is passed through a microwave oven to remove water content, placed into a housing 40 and passed through a hot air dryer. After such further treatment, the material is removed from housing 40 and the outer portions of the lower portion are removed on a diamond tool lathe to form a curved outer surface on the lower portion, such curved outer surface terminating along surface the upper edges of the vertically extending sidewalls. Thus, the outer surface is a concave surface suitable for use in a particulate filter assembly.

Thus, with the method described above, the extruder provides a shape (i.e., the lower portion) that has the rigidity through its vertically extending sidewalls which can then be more easily handled and manipulated directly out of the extruders without deformation as with corners of a triangular prism shaped extruded structure. This shape can then follow the normal DPF manufacturing process and be inserted into the segmented DPF in the same manner as the typical rectangular segments. More particularly, the extruded structure can be picked up and placed on the necessary conveyor belts for transfer into the microwave drying ovens on its vertically extending sidewalls. Once the extrusion has been dried it can pass through the remaining portions of the DPF manufacturing process in the same manner as the typical rectangular segments.

A number of embodiments of the invention have been described. Nevertheless, it will be understood that various modifications may be made without departing from the spirit and scope of the invention. Accordingly, other embodiments are within the scope of the following claims.

What is claimed is:

1. A filter, comprising:
    a honeycomb material having a lower portion and an upper portion:
        the lower portion having:
            a bottom surface;
            a pair of vertically extending sidewalls terminating along outer edges of the bottom surface;
        the upper portion having:
            a pair of opposing, pitched, sidewalls having lower edges terminating along upper edges of the vertically extending sidewalls, and upper edges terminating along a common edge.

2. An extruder for receiving material to be extruded; such extruder being configured to convert such material into:
    a honeycomb structure having a lower portion and an upper portion, the lower portion having a bottom surface and a pair of vertically extending sidewalls terminating along outer edges of the bottom surface, the upper portion having a pair of opposing, pitched, sidewalls having lower edges terminating along upper edges of the vertically extending sidewalls and upper edges terminating along a common edge.

3. An extruder having:
    a honeycomb structure with a lower portion and an upper portion, the lower portion having a bottom surface and a pair of vertically extending sidewalls terminating along outer edges of the bottom surface, the upper portion having a pair of opposing, pitched, sidewalls having lower edges terminating along upper edges of the vertically extending sidewalls and upper edges terminating along a common edge.

4. A method for forming a filter, comprising:
    forming a honeycomb material having: a lower portion and an upper portion; the lower portion having: a bottom surface; and a pair of vertically extending sidewalls terminating along outer edges of the bottom surface; the upper portion having: a pair of opposing, pitched, sidewalls having lower edges terminating along upper edges of the vertically extending sidewalls, and upper edges terminating along a common edge; and
    removing outer portions of the lower portion to form a curved outer surface on the lower portion, such curved outer surface terminating along surface the upper edges of the vertically extending sidewalls.

5. The method recited in claim 4 wherein the forming comprises an extrusion process.

6. The method recited in claim 4 wherein the outer surface is a concave surface.

* * * * *